United States Patent Office 3,194,562
Patented July 13, 1965

3,194,562
SLIDE PROJECTOR SCENE SHIFTING MEANS AND DISTANCE COMPUTER MEANS
Maximilian R. Speiser, 17 W. 60th St., New York, N.Y.
Filed Apr. 8, 1963, Ser. No. 271,352
4 Claims. (Cl. 273—184)

This invention relates generally to computer-type golf games of the class disclosed in my co-pending application Ser. No. 34,812, filed June 8, 1960, entitled Computer Type Golf Game, now Patent No. 3,091,466, and more particularly to an improved scene-shifting device adapted to add a realistic change of scenery as the golfer advances along the course of each hole toward the green.

In the above-identified application, there is illustrated an embodiment in which the golfer drives a ball toward a projected representation of the green, the ball being intercepted by a net placed in front of the screen upon which the projection is made, the time elapsed before striking the net being computed, and a visual representation of the number of yards the ball would have traveled had the net not been present being displayed to the golfer. In actual play, however, with each shot in which the ball advances toward the green an appreciable distance, the golfer will walk to the new location of the ball preparatory to making another stroke at the ball. The green will therefore appear that much closer to the golfer with each stroke of any appreciable yardage. To afford proper realism to the golfer, it is therefore necessary that the projected image upon the screen be altered a corresponding amount with each shot, so that as the ball progresses toward the green, the green will appear that much larger to the golfer. While it is theoretically possible to change the projected image each time the ball advances as little as five yards, the large number of slides required makes this impractical, and a sufficient approximation of an accurate representation can be made if the change occurs approximately every fifty yards.

It is therefore among the principal objects of the present invention to provide electronically operated means associated with the computer means of the above-described device for closing a relay wihch operates a conventional magazine-type slide projector positioned in back of the above-mentioned screen, to accumulate attained yardage through several strokes, and utilize stored information to periodically operate the slide-changing mechanism of the slide projector to move slides into position for projection, the slides bearing images corresponding to the field of view which would be seen by the golfer on attaining the corresponding yardage.

Another object of the invention lies in the provision of means of the type described which may be readily incorporated into existing prior art devices of the above-mentioned type, with little or no modification, whereby the usefulness of the same may be increased.

Still another object of the invention lies in the provision of means of the class described in which the cost of fabrication thereof may be of a reasonably low order thereby permitting consequent wide sale, distribution and use.

Yet another object of the invention lies in the provision of means of the class described which may function without manual manipulation on the part of the golfer, all control of the slide-changing mechanism emanating from computer means.

A feature of the invention lies in the fact that the device may be fabricated as a unit separate from other components of the computer-type golf game, thereby simplifying maintenance and servicing over periodic intervals.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

Figure 1:
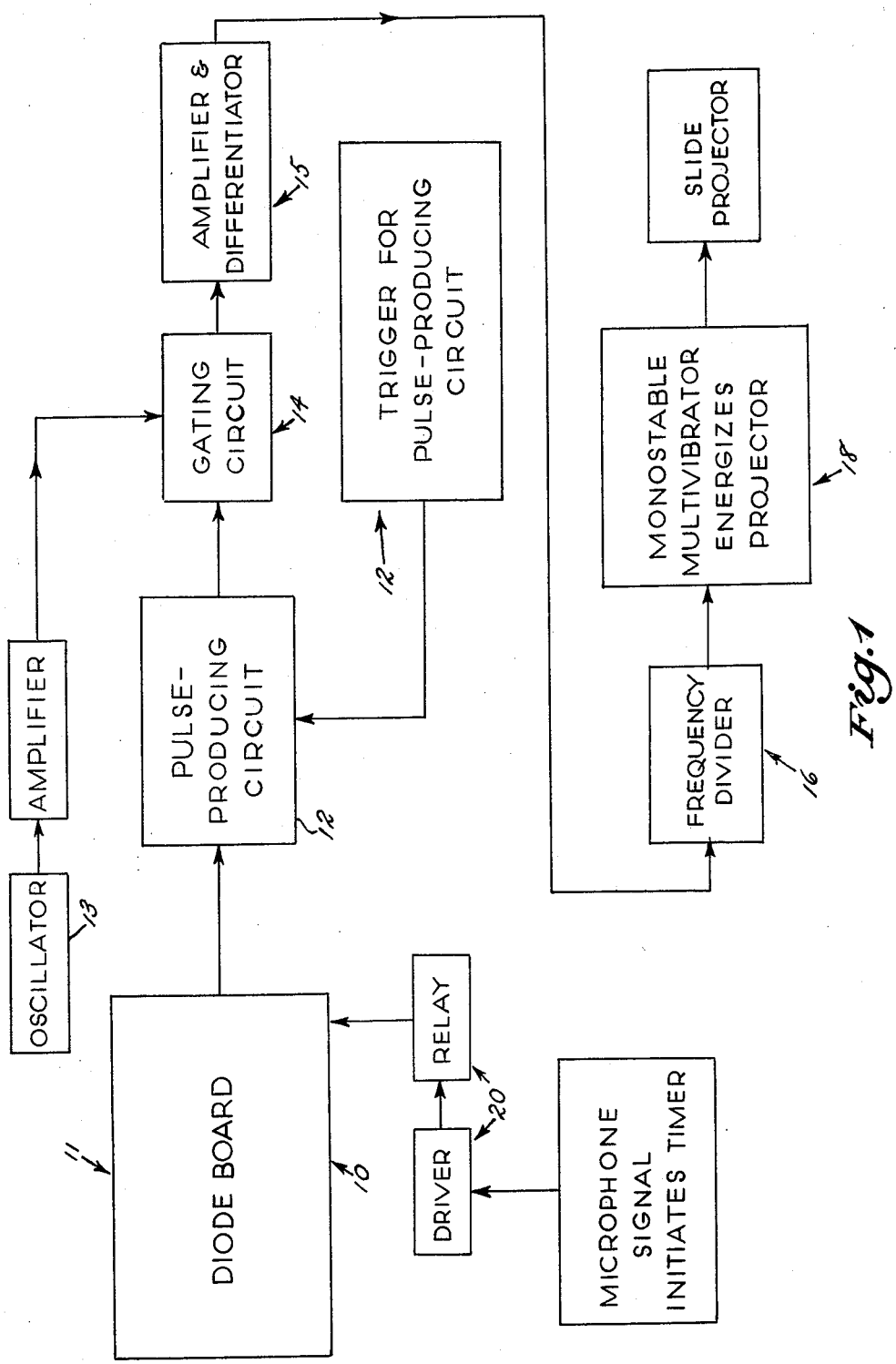
FIGURE 1 is a block diagram showing an embodiment of the invention.
Figure 2A:
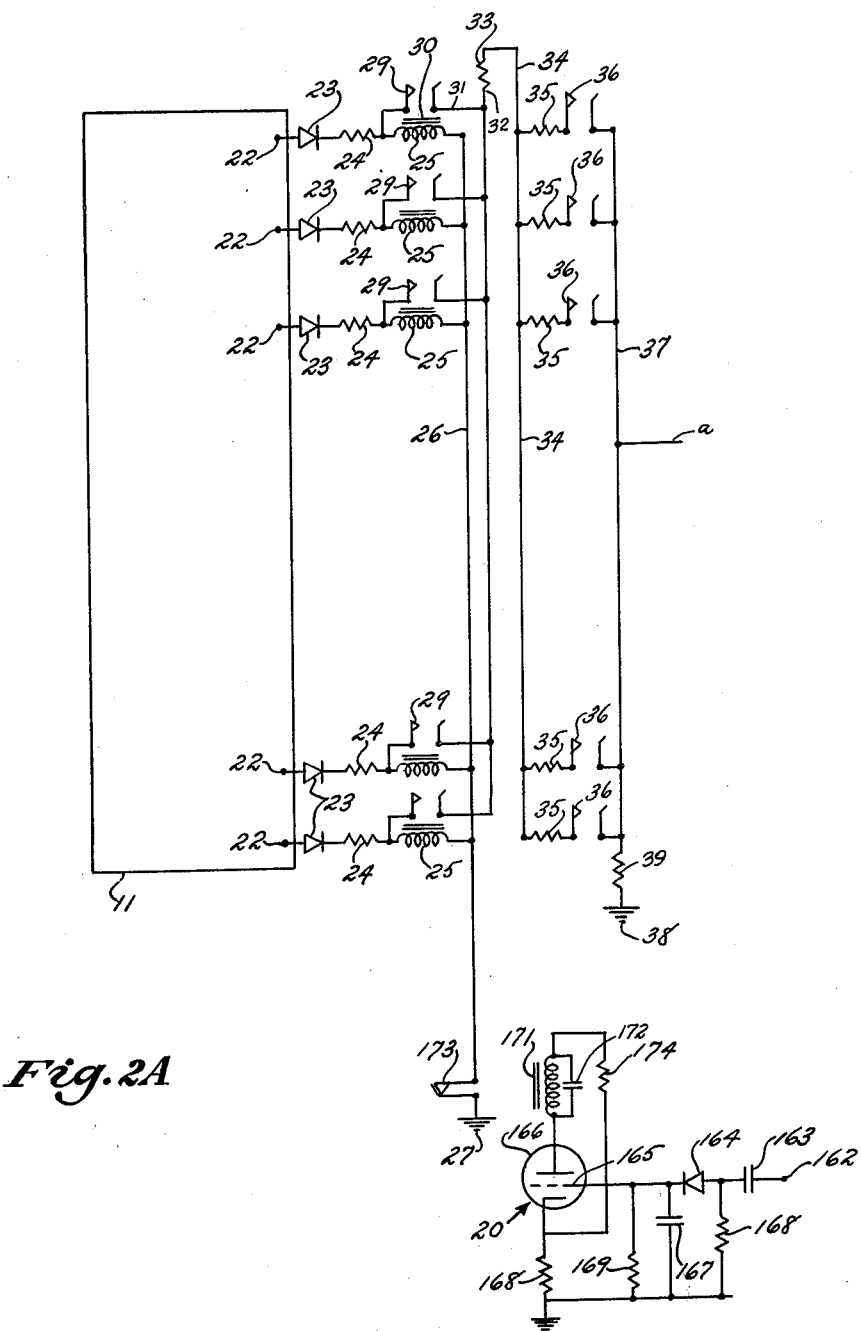
FIGURES 2A, 2B and 2C are schematic diagrams showing the electronic components comprising parts of the embodiment.
Figure 2B:
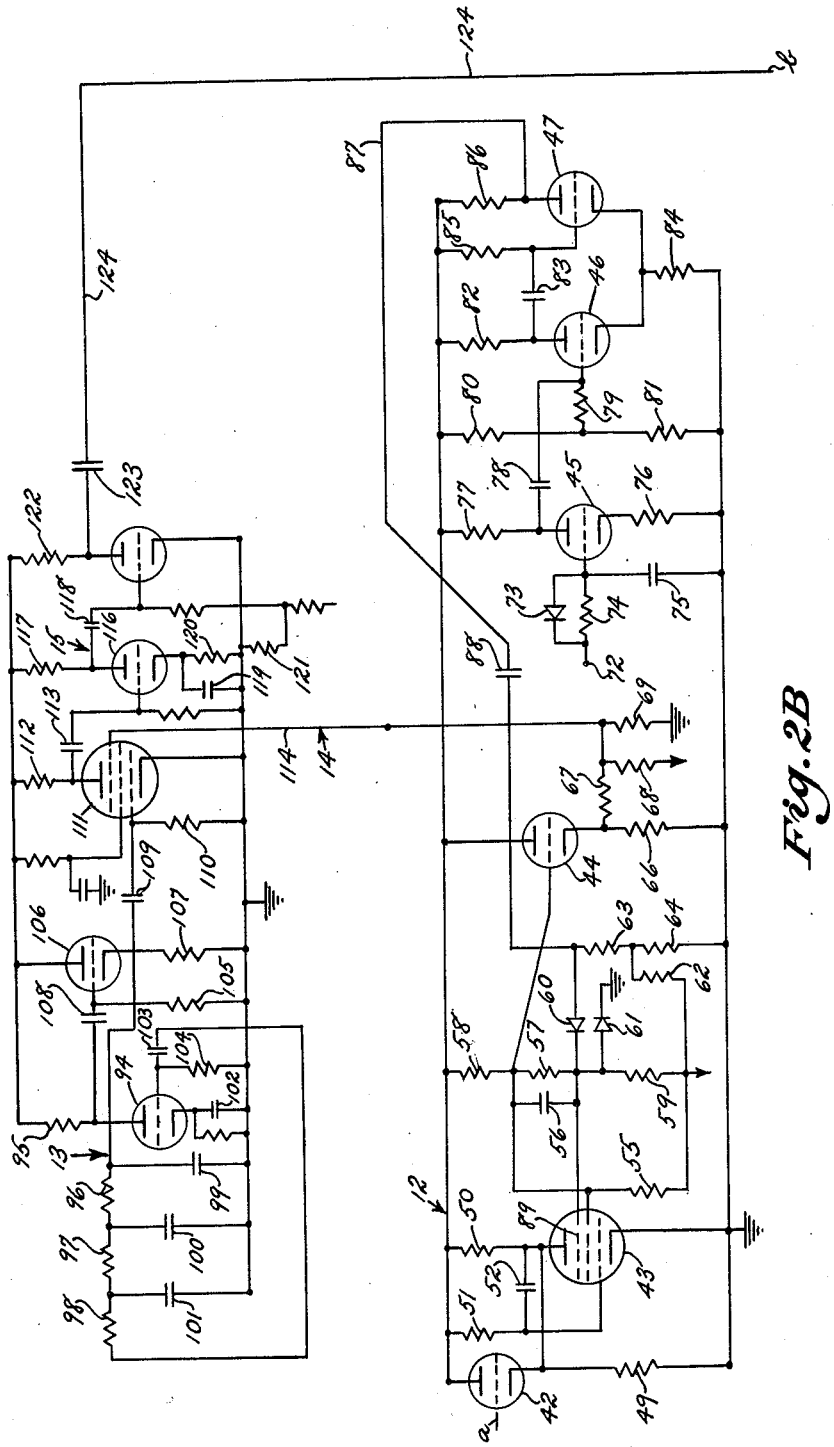
Figure 2C:
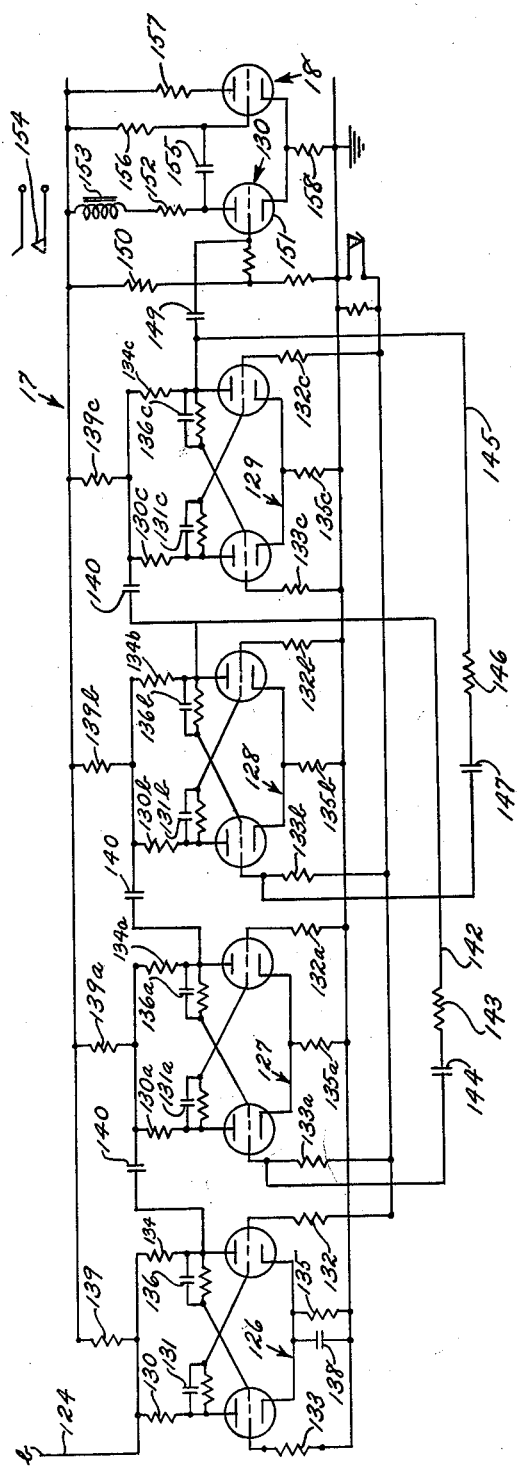

With reference to FIGURE 1 of the drawings, the device, generally indicated by reference character 10, is employed in conjunction with a diode board 11 which forms a part of a computer-type golf game of the type disclosed in my co-pending application Serial No. 34,812, mentioned hereinabove, and includes a pulse-producing circuit 12, an oscillator circuit 13, a gating circuit 14, an amplifier and differentiating circut 15, a frequency divider circuit 16, a monostable multivibrator unit 18, and a driver and relay circuit 20.

The pulse-producing circuit 12 may be of a type widely known in the art as a phantastion circuit, a type characterized in being able to produce an electronic square wave pulse directly proportional to the voltage impressed upon the same. It is therefore connected directly to the diode board 11, which, as disclosed in my co-pending application Serial No. 34,812, includes a terminal 22 for each score attained in terms of yardage with each stroke. The terminals are similar, each being connected to a diode 23, and a resistor 24 to the coil 25 of a relay, and thence through a main ground conductor 26 to a ground terminal 27. Current also flows from the resistor 24, when the coil 25 is energized, through a normally open switch 20 operated by the relay 30, through a conductor 31, a second trunk conductor 32, and a common resistor 33 to a common trunk conductor 34. From there current flows through a corresponding resistor 35 and switch 36 operated by the identical relay 30 to a third trunk conductor 37 to ground at 38 through a common resistor 39. During operation of the diode board 11, depending upon the yardage attained, one of the contacts 22 will receive a voltage corresponding to the yardage attained, and upon energization of the corresponding relay 30, this voltage will appear in the conductor 37 and be fed to the pulse-producing circuit 12.

The determined voltage enters the circuit 12 through the grid of a first triode 42 which provides high input impedance. The circuit 12 also includes a pulse-generating tube 43, a cathode follower tube 44, and a triggering tube 45 for a monostable multivibrator 46 which in turn triggers the pulse-generating tube 43.

As is known in the art, in the phantastion circuit the input triode 42 is connected with a pair of load resistors 49 and 50, as well as a timing couplet including a resistor 51 and a condenser 52. The pulse-generating tube 43 is a pentode type, and includes in its circuitry a grid leak resistor 55, a speed-up condenser 56, and a resistor 57 which controls feedback between adjacent grids. Resistor 58 is a load resistor for the second grid of the pentode, while reisstor 66 supplies negative voltage to act as a suppressor. Reference character 60 indicates a diode in the triggering circuit which receives a signal from the triggering monostable multivibrator 46. The diode 61 is grounded. Resistors 62, 63 and 64 provide a negative bias for the diode 60.

Referring to the cathode follower 44 and its circuitry, reference characters 66 designates a load resistor, and 67 an insulating resistor. Resistors 68 and 69 provide a negative bias for the cathode follower.

The circuitry of the triggering tube 45 includes an input terminal 72 which receives a signal from the golf game computer when the visually displayed score has ceased operation (as evidenced by the disappearance of the visual representation from the visual indicator tubes). Reference character 74 indicates an integrating resistor connected in parrallel with a diode 73 leading to the grid of the tube 45. Condenser 75 is an integrating condenser, and serves to short small signals, while resistors 76 and 79 are insulating resistors for the tube input. 77 designates a load resistor for this tube, and 78 a coupling condenser. 80 and 81 are bias resistors for one portion of the monostable multivibrator 46, and 82 designates a load resistor therefor. 84 is a feedback resistor for one portion of the multivibrator, 85 a timing resistor, and 86 a load resistor. The output of the monostable multivibrator is fed through a conductor 87, and through the condenser 88 to the grid 89 of the triode tube 42, in well-known manner.

The oscillating circuit 13 includes an oscillating triode 94, having a load resistor 95 and phase lag resistors 96, 97 and 98, operating in conjunction with condensers 99, 100 and 101. 102 is a bias condenser serving to short unwanted frequencies, and 103 designates a coupling condenser. Resistor 104 serves as a grid leak for the oscillating triode 94, and resistor 105 serves as the grid leak for the cathode follower 106 which serves as a buffer for the oscillator tube. 107 is the load resistor for the cathode follower 106, while 108 designates a coupling condenser operating in conjunction with condenser 109. Resistor 110 serves as a grid leak for a gating pentode 111, which forms the basis of the circuit 14.

The gating pentode 111 is normally in "off" or non-conductive condition, and is connected to a load resistor 112, a coupling condenser 113, and a gating conductor 114 which leads to the cathode follower 44 of the phantastion circuit.

The differentiating amplifier serves to sharpen the shape of oscillations from the usual square wave to peak form, and includes a differentiating tube 116 connected to a load resistor 117, a coupling condenser 118, and a bias condenser 119. Resistor 120 is a coupling resistor, while resistor 121 prevents the transmission of a shorting signal from the plate of tube 116. 122 is a load resistor, and 123 a coupling condenser. The output of the tube 116 travels through a conductor 124 to the frequency divider circuit 17, preferably in the form of a simple binary-type computer.

The frequency divider circuit 17 includes a first binary 126, a second binary 127, a third binary 128, and a fourth binary 129, the output of which is fed to the monostable multivibrator circuit 18.

The first binary 126 includes a load resistor 130, speed-up capacitors 131 and 136, and bias resistors 132, 133, 134 and 135. 138 designates a small condenser inserted in the circuit for improving reliability, while 139 designates a load resistor for the monostable multivibrator 18. 140 designates a coupling condenser to the second binary.

As may be observed from a consideration of the drawing, the second, third and fourth binaries are generally similar to the first binary, and, to avoid needless repetition, parts corresponding to those of the first binary have been designated by similar reference characters with the additional suffix a, b, and c, respectively. Since, as will more fully appear at a point later in the disclosure, the binary circuit is concerned with counting every tenth oscillation, there is provided a first feedback conductor 142 having a resistor 143 and condenser 144 interconnecting the output of the third binary with the second binary, and a conductor 145 having a resistor 146 and condenser 147 feeding the output of the fourth binary to the third binary.

The monostable multivibrator circuit 18 serves to convert the output of the frequency divider 17 to operate the slide changer mechanism of the slide projector. It is connected to a coupling condenser 149, and a voltage dividing resistor 150 at a first part 151 of a single envelope-type tube. Resistor 152 serves to limit current through the relay 153, the solenoid of which is connected directly to the projector switch 154. The capacitor 155 determines the pulse length of the relay 153, and may be varied depending upon the particular type of slide-changing mechanism (not shown) employed.

The driver and relay circuit serves to control the time and period of operation of the device 10 with respect to the operation of the computer and other components of the golf game with which the device is associated. This circuit includes a terminal 162 which receives an input signal directly from the dynamic microphone which signals the striking of the ball by the club at the commencement of a drive by the golfer. The signal is fed through a condenser 163 and diode 164 to the grid 165 of a triode 166. 167 designates a condenser which makes the circuit operative for a fixed period of time, while resistor 168 serves as a reference for the diode 164. Resistor 169 is a grid leak for the tube 166, and resistor 174 is a voltage divider. The relay 171 operates from the output of the tube 166. 172 is a condenser for damping the coil of the relay 171, the relay serving to operate the switch 36.

*Operation*

Upon the instant in which the golf ball is struck, a signal from the dynamic microphone produces a signal fed into the computer unit of the golf game. This same signal operates the relay 171, causing the switch 36 to open and disconnect all of the relays 30 to become inoperative. Owing to the presence of the condenser 167, the relay 171 holds the switch open for approximately one second, to give the computer sufficient time to compute the projected yardage obtained on the particular shot. During operation of the computer, small currents will reach the diode board, but as the diode board relays are maintained inoperative, no current flows to the phantastion circuit.

Upon the completion of the computation, a particular score appears on the visual indicator tubes, and concurrently with this computation, a voltage is impressed upon the corresponding terminal 22. There is no voltage on the other contacts on the diode board. The value of the voltage is determined by the value of the particular resistors 24 and 33, and the effective value reaching the phantastion circuit determines the length of the pulse produced thereby.

With the closing of the switch 36, the corresponding relay 30 becomes operative, and the proper value of current then flows. This can take place only after the computer has completed its computation, and a signal has been communicated to the terminal 72.

Since the relay 30 holds the switches 29 and 36 closed, once energized, voltage to the phantastion remains after voltage on the diode board has vanished.

Upon the triggering of the phantastion circuit, the length of the pulse developed is directly related to the input voltage, and the gating circuit will pass oscillator signals for exactly that period of time. In the disclosed device 10, the frequency of the oscillating circuit is 10 cycles per second. Assuming a drive of, for example, 180 yards, the diode board voltage would be such that the phantastion pulse would be 3.6 seconds. Upon operation, 36 oscillations would be passed through, suitably amplified and differentiated prior to entering the frequency divider circuit.

Because of the particular construction disclosed in my co-pending application Serial No. 34,812, in which minimum distances are disregarded, the frequency divider is preferably automatically reset to the first four pulses, equivalent to a score of 20 yards. Thus the 36 pulses fed to the frequency divider plus the four pulses initially reset will give a total of 40 pulses, which after division will give four pulses to the monostable multidivider. Accordingy, the relay 153 will operate four times, and the projector switch 154 will cause four successive slides in the projector to change (each slide corresponding roughly to a 50-yard advance toward the green).

With the making of a second stroke by the golfer, the process is repeated unttil the player theoretically arrives on the green, the number of slides being used depending upon the length of the course running from theoretical tee to hole. With the commencement of the next hole, a manual or automatic reset of four pulses may again be placed in the frequency divider circuit, and the process repeated.

I wish it to be understood that I do not consider the invention limited to the precise details of structure shown and set forth in this specification, for obvious modifications will occur to those skilled in the art to which the invention pertains.

I claim:

1. In a computer-type golf game, including an optical slide projector having slide-changing means, and computer means for determining the length or projected trajectory of a golf ball in terms of a voltage, the improvement comprising: means for automatically actuating said slide-changing means upon the attainment of predetermined distances as indicated by said computer means, said means including a pulse-producing circuit connected to said computer means and generating a pulse corresponding in length to the value of said variable voltage, oscillating means producing an oscillating current, the frequency of which corresponds to a small multiple of the unit of distance measurement used by said computer means, gating means connected to said pulse-producing circuit operative to pass oscillations upon the occurrence and during the duration of a pulse emanating from said pulse-producing circuit, frequency divider means connected to said oscillating means for counting a fractional part of the oscillations received, and relay means controlled by said frequency divider means for actuating said slide-changing means once for each operation of said relay means, said relay means operating once for each predetermined multiple of oscillations counted.

2. In a computer-type golf game, including an optical slide projector having slide-changing means, and computer means for determining the length of projected trajectory of a golf ball in terms of a voltage, the improvement comprising: means for generating an electrical pulse, connected to said computer means and providing a signal corresponding in period to said voltage produced by said computer, means for producing an oscillating electrical signal, the frequency of which corresponds to a multiple of the units of distance measurement employed by said computer means, gating means controlled by said means for generating said pulse, binary computer means connected to said gating means for counting a sub-multiple of the number of oscillations passed by said gating means during the duration of a single pule, monostable multi-vibrator means operated upon the occurrence of a given number of oscillations passing through said binary computer, and relay means controlled by said monostable vibrator means operating said slide-changer means once for each operation of said monostable multi-vibrator means.

3. In a computer-type golf game, including an optical silde projector having slide-changing means, and computer means for determining the length of projected trajectory of a golf ball in terms of a voltage, the improvement comprising: a phantastion circuit producing an electrical pulse corresponding in length to the value of a voltage determined by said computer means, triggering means connected to said phantastion circuit and operated by said voltage from said computer, gating means controlled by pulses produced by said phantastion circuit, oscillator means including differentiating amplifier means producing an oscillating signal of predetermined frequency corresponding to a multiple of the unit of distance measure employed by said computer means, frequency divider means connected to said oscillator means through said gating means for counting a fractional part of the oscillations received, monostable multivibrator means controlled by said monostable multivibrator means and controlled by said said frequency divider means, and relay means controlling said slide-changer means of said slide projector once for each operation of said multi-vibrator means.

4. In a computer-type golf game, including an optical slide projector having slide-changing means, and computer means for determining the length of projected trajectory of a golf ball in terms of a voltage, the improvement comprising: timing means connected to said computer means and producing a signal for a period of time proportional to the distance determined by said computer, oscillator means producting an oscillating signal of predetermined frequency corresponding to the units of distance measurement employed by said computer means, gating means connected to said oscillator means, and controlled by said timing means, and relay means connected to said oscillator means and operated once for each predetermined multiple of oscillations passing through said gating means, said relay means controlling said slide-changer means to operate the same once for each operation of said relay means.

References Cited by the Examiner

UNITED STATES PATENTS 2,783,999    3/57    Simjian _____ 273—181
3,091,466    5/63    Speiser _____ 273—184

FOREIGN PATENTS 915,346    1/63    Great Britain.

DELBERT B. LOWE, *Primary Examiner.*